(12) United States Patent
Hasegawa

(10) Patent No.: US 6,850,679 B2
(45) Date of Patent: Feb. 1, 2005

(54) MICROSTRUCTURED OPTICAL FIBER AND METHOD OF MAKING

(75) Inventor: Takemi Hasegawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 10/391,754

(22) Filed: Mar. 20, 2003

(65) Prior Publication Data

US 2003/0180018 A1 Sep. 25, 2003

(30) Foreign Application Priority Data

Mar. 25, 2002 (JP) ........................................ 2002-083805

(51) Int. Cl.⁷ ................................................. G02B 6/20
(52) U.S. Cl. ...................................... 385/125; 385/123
(58) Field of Search .............................. 385/123–128; 65/385, 393, 406, 414, 415

(56) References Cited

U.S. PATENT DOCUMENTS 6,097,870 A  8/2000  Ranka et al.
2004/0105640 A1 * 6/2004 Hasegawa ................... 385/125
2004/0114897 A1 * 6/2004 Koshiba et al. ............. 385/123

FOREIGN PATENT DOCUMENTS

WO  WO 99/64903  12/1999
WO  WO 00/37974  6/2000

OTHER PUBLICATIONS

"Photonic Crystal Fibers", J.A. West et al., Proc. 27th Eur. Conf. on Opt. Comm. (ECOC'01—Amsterdam), pp. 582–585.

"Dispersion properties of photonic bandgap guiding fibers", Stig E. Barkou et al., OFC'99 FG5, pp. 117–119.

* cited by examiner

Primary Examiner—Phan T. H. Palmer
(74) Attorney, Agent, or Firm—McDermott Will & Emery LLP

(57) ABSTRACT

A microstructured optical fiber is structured with a core region and a cladding region surrounding the core region. A cross section of the fiber portion conforms to a translationally symmetric lattice, a center of each sub medium region in the outer region coinciding with respective lattice points, and a plurality of sub medium regions in the inner region having centers that are offset from respective lattice points.

15 Claims, 10 Drawing Sheets

MICROSTRUCTURED OPTICAL FIBER AND METHOD OF MAKING

FIELD OF THE INVENTION

The present invention relates to fiber optic waveguides, more particularly to arrangements of sub medium regions in microstructured optical fibers.

BACKGROUND

The recent development of the microstructured optical fiber, in which a high index core region is surrounded by cladding having a mix of silica and air, offers new fiber properties by virtue of the large refractive-index contrast that exists between glass and air. A cladding structure may have a spatially uniform average refractive index that can be adjusted to meet a desired relationship with the core index. FIG. 1 illustrates a prior art microstructured optical fiber in cross section. In the optical fiber 1b, a plurality of holes 3b are arranged in silica glass 2b. The diameters of the holes 3b are substantially uniform in the cross section and the centers of the holes 3b substantially coincide with the lattice points 4b of a hexagonal lattice. With substantially periodically arranged sub medium regions in the cladding, the core region can be realized by substituting one or more sub medium regions with main medium (silica glass, for example). A lattice point 41b in the center of the fiber has no corresponding hole, so that the center of the fiber has a higher average refractive index than that of the surrounding region. As a result, a lightwave is localized in the center of the fiber and guided over the fiber.

It is difficult to realize a high yield of production and a low transmission loss in the production of microstructured optical fibers with zero or negative chromatic dispersion, zero or negative chromatic dispersion slope, and/or small effective core area. For realizing such characteristics in microstructured optical fibers, air holes with small diameters and accurate control of the dimension and arrangement of the air holes are necessary. However, decrease in the hole diameter causes increase in the surface tension at the surfaces of the holes during fiber drawing. The increase in surface tension causes excess shrinking of the holes resulting in increase in the uncontrollability of the optical characteristics of the drawn optical fiber. Although influence of surface tension can be decreased by lowering the drawing temperature, the drawing tension increases by decrease in drawing temperature, resulting in increased occurrence of fiber breaking during drawing, increase in transmission loss, and degradation in durability against UV radiation.

SUMMARY OF THE INVENTION

The present invention fulfills the above described fiber characteristic needs, while overcoming the drawbacks of the prior art, at least in part, by offsetting sub medium regions from the lattice points of periodical lattice in the innermost region of the fiber to form the core region. As a result, it becomes possible to realize valuable characteristics such as zero or negative chromatic dispersion, zero or negative chromatic dispersion slope, and small effective core area with a structure in which the curvature radii of sub medium regions are larger than those of the prior art. Increase in curvature radii of sub medium regions reduces the influence of surface tension during fiber drawing, resulting in a high controllability of the fiber structure and optical characteristics, a high yield of production, a low transmission loss, and a high durability against UV radiation.

The following terms are defined to aid description of microstructured fiber characteristics.

A main medium is a medium that can constitute an optical fiber by itself. On the other hand, a sub medium is not necessarily able to constitute an optical fiber by itself. For example, glasses and polymers can be used as a main medium or a sub medium, while liquids, gases and vacuum can be used as a sub medium but not a main medium.

The average refractive index of a region composed of several media i (i=1. . . M) is defined by the following formulas:

$$n_{avg} = \left\{ \left( \sum_{i=1}^{M} n^2[i] f[i] \right) \Big/ \left( \sum_{i=1}^{M} f[i] \right) \right\}^{1/2}$$

wherein n[i] and f[i] are respectively the refractive index and the volume of medium i.

The lattice cell of a lattice point is the polygon region outlined by perpendicular bisectors between that lattice point and the neighboring lattice points. In a structure where holes are periodically arranged, the relative hole diameter is the ratio of the hole diameter d to the pitch L of the periodical lattice. If a structure possesses translational symmetry, an operation to translate the structure by a non-zero distance keeps the structure the same. The direction and distance of a translational operation can be represented by a vector. When there are N independent vectors representing the translational operation keeping the structure the same, that structure possesses N-dimensional translational symmetry.

Advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
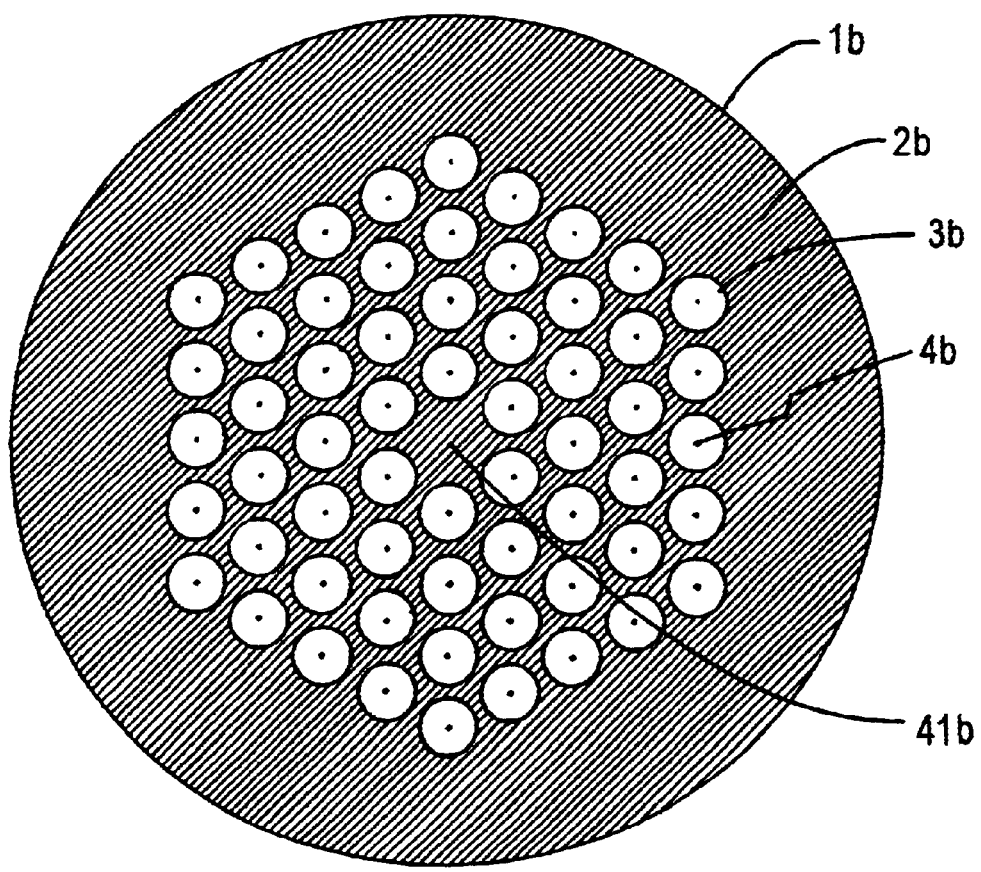
FIG. 1 is an illustration of a cross section taken perpendicular to the fiber axis of a prior art microstructured optical fiber.
Figure 2:
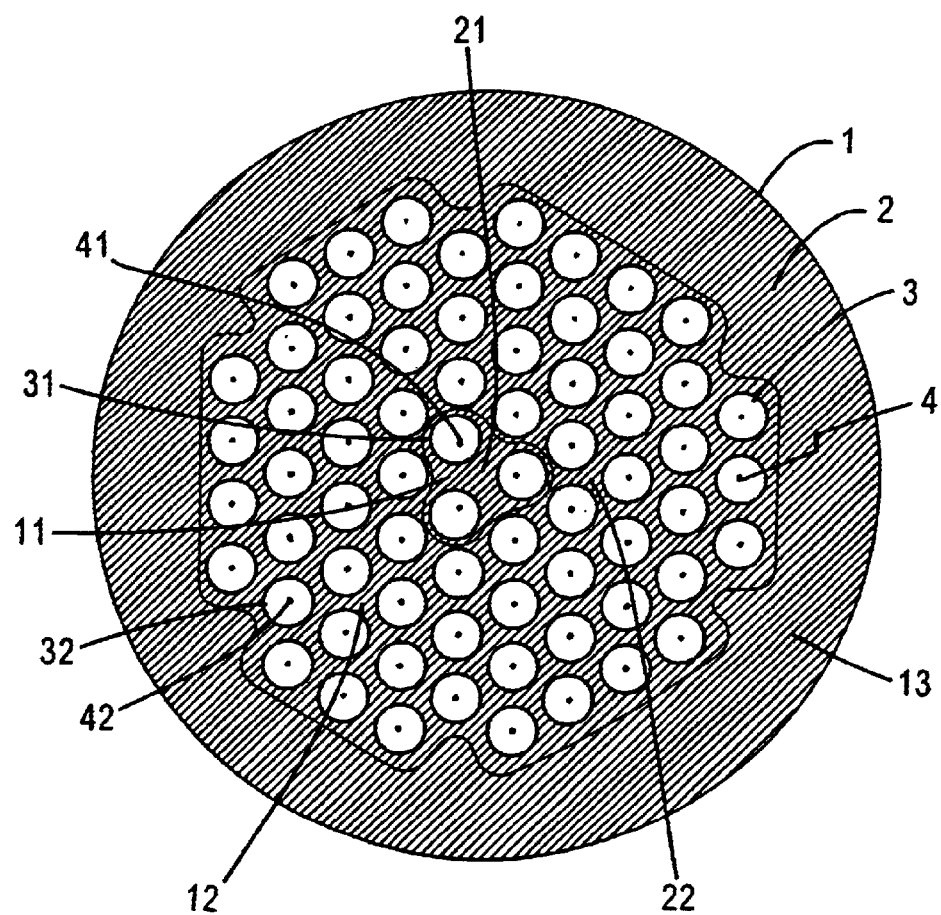
FIG. 2 is an illustration of a cross section taken perpendicular to the fiber axis of a microstructured optical fiber in accordance with the present invention.

FIG. 2 shows the cross section of an optical fiber 1 of a first embodiment of the present invention, in which a plurality of holes 3, which are sub medium regions, are arranged in silica glass 2, which is a main medium. The cross section has an inner region 11 and an outer region 12 surrounding the inner region. The arrangement of the holes is substantially a hexagonal lattice. In the outer region, the centers of the holes 32 substantially coincide with the outer lattice points 42, which are a part of the lattice points 4 of a hexagonal lattice and are located in the outer region. On the other hand, in the inner region, the centers of the holes 31 are apart from the inner lattice points 41 by approximately 0.1 lattice period outward. The inner lattice points are a part of the lattice points 4 of the hexagonal lattice and are located in the inner region. The diameters of the holes 31 and 32 are substantially uniform in the cross section. For each lattice cell of the lattice point 41 or 42, a single hole 31 or 32 has its center in the cell. In describing the present invention, the hole located in a lattice cell of a lattice point is called the hole corresponding to the lattice point.

The outer region is further surrounded by a jacket region 13 composed of silica glass. Although the jacket region is not essential for guidance of lightwave in the core of the optical fiber, it has effects to improve the mechanical strength of the optical fiber and to reduce microbending loss, which is one of the causes of transmission loss. Because of the arrangement of the holes described above, the area of the main medium region 21 between the holes 31 in the inner region 11 becomes larger than that of the main medium region 22 between the holes 32 in the outer region 12. As a result, the inner region has a higher average refractive index than that of the outer region, and it becomes possible to localize a lightwave in the main medium region 21 in the inner region 11 by total reflection and guide it over the optical fiber.

Investigation of optical characteristics has been done on three structures ha8, ha7 and ha6 of the present invention and three structures hb8, hb7 and hb6 of the prior art. Relative hole diameters of these structures are given in the following table.

TABLE 1

| Symbol | ha6 | ha7 | ha8 | hb6 | hb7 | hb8 |
|---|---|---|---|---|---|---|
| Relative hole diameter | 0.6 | 0.7 | 0.8 | 0.6 | 0.7 | 0.8 |

In the investigation, the hole diameter has been varied and other dimensions in the fiber have been varied proportionally.

Figure 3:
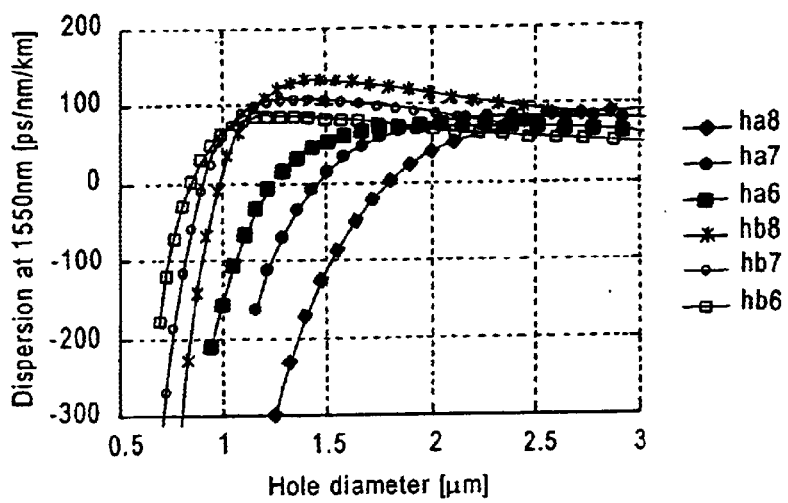
FIGS. 3–5 are graphs showing various fiber characteristics for each fibers of the present invention and prior art fibers.
Figure 4:
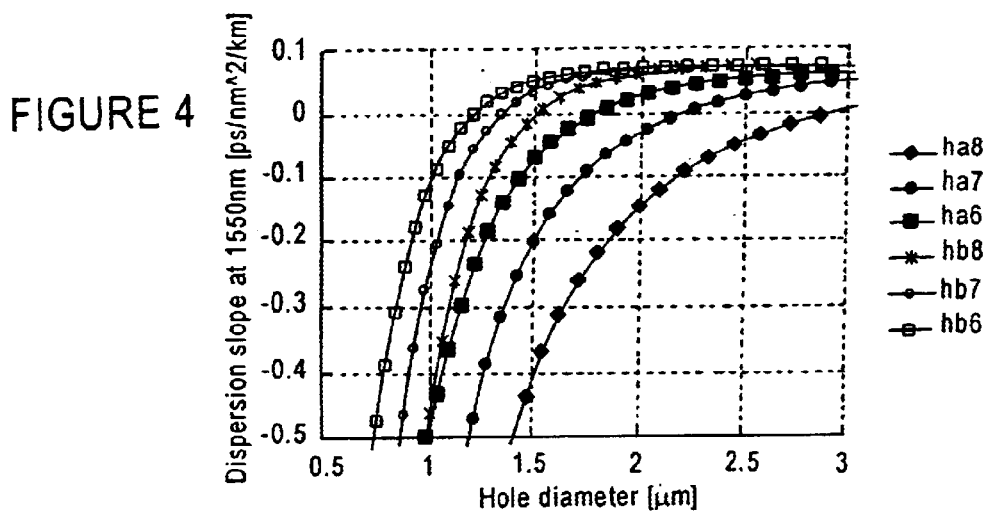
Figure 5:
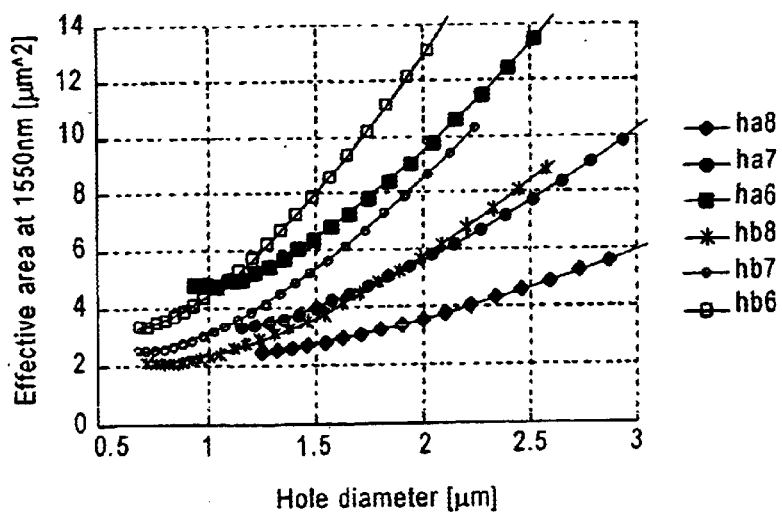

FIGS. 3–5 show various fiber characteristics for each of the listed fibers. FIG. 3 shows the chromatic dispersion at 1550 nm wavelength as a function of the hole diameter. As shown in the figure, the increase in the relative hole diameter results in an increase in the hole diameter below which zero or negative dispersion can be obtained. The hole diameter below which zero or negative dispersion can be obtained is larger for the fibers of the present invention than in the prior art fibers having the same relative hole diameters. FIG. 4 shows the chromatic dispersion slope at 1550 nm wavelength as a function of the hole diameter. As shown in the figure, the increase in the relative hole diameter results in an increase in the hole diameter below which zero or negative dispersion slope can be obtained. The hole diameter below which zero or negative dispersion slope can be obtained is larger for the fibers of the present invention than in the prior art fibers having the same relative hole diameters. FIG. 5 shows the effective core area at 1550 nm wavelength as a function of the hole diameter. As shown in the figure, the increase in the relative hole diameter results in an increase in the hole diameter below which small (less than 5 $\mu m^2$) effective core area can be obtained. The hole diameter below which small (less than 5 $\mu m^2$) effective core area can be obtained is larger for the fibers of the present invention than in the prior art fibers having the same relative hole diameters. These graphs demonstrate advantages obtained with fibers of the present invention.

It is also preferable to add dopants such as germanium and fluorine to the main medium in the main medium region 21 in the inner region 11, and decrease the viscosity therein. As a result, it becomes possible to reduce the concentration of the drawing tension to the main medium region in the inner region, in which a guided lightwave is to be localized, and reduce excess transmission loss due to residual tension. It is also preferable to add 1–35 mol % of germanium to the main medium in the main medium region 21 in the inner region 11, and form a fiber grating by varying the refractive index along the fiber length by exposing the optical fiber to UV radiation. As a result, it becomes possible to realize a wavelength-selective transmission and a wavelength-selective directional coupler. It is also preferable to vary the cross-sectional structure along the fiber length. As a result, it becomes possible to change chromatic dispersion along the fiber length and form a dispersion-managed transmission line. It is also preferable to form a length of section in which no holes are included. By providing such sections in the fiber ends, it becomes possible to prevent the entrance of contaminants into the holes. It is also preferable to employ compound glass or polymer as main medium, or to fill the holes with gases or metals having optical amplifying properties. As a result, it becomes possible to enhance the efficiency of nonlinear optical effects, and/or to realize an optical amplifying function.

Figure 6:
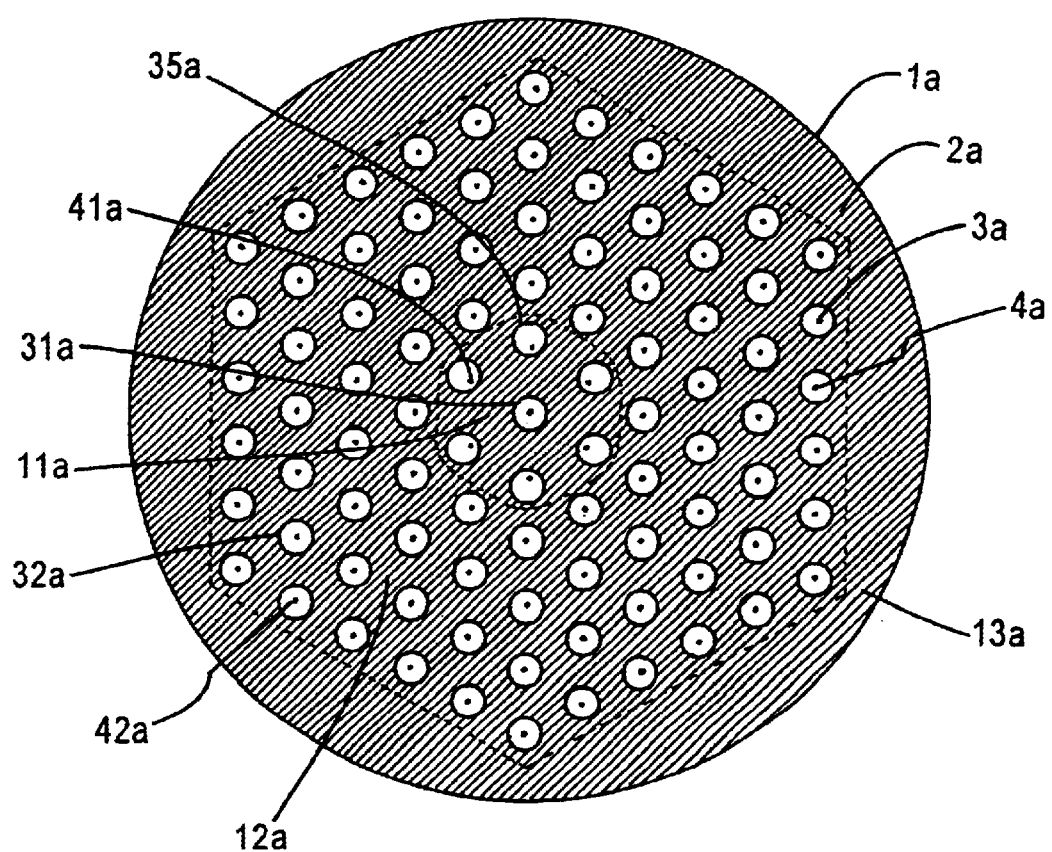
FIG. 6 is an illustration of a cross section taken perpendicular to the fiber axis of a microstructured optical fiber in accordance with a second embodiment of the present invention.

FIG. 6 shows the cross section of an optical fiber 1a of a second embodiment of the present invention. In this structure, a plurality of holes 3a are arranged in silica glass 2a, and the holes 32a in the outer region 12a are arranged so that there centers coincide with respective lattice points 42a, which are a part of the lattice points 4a of a hexagonal lattice and located in the outer region, and consequently the arrangement possesses a two-dimensional translational symmetry. Other media having appropriate refractive indices may be used in lieu of holes. Because of the two-dimensional translational symmetry, it is possible to localize a lightwave in the inner region 11a by Bragg reflection and guide it over the fiber. Since the arrangement of the holes 32a is periodical in the outer region 12a, the outer region 12a can reflect a lightwave belonging to a certain range of frequencies and propagation constant by Bragg reflection. Although such a lightwave cannot propagate in the outer region 12a, since the structural periodicity is broken in the inner region 11a, it localizes and propagates in the inner region 11a.

Figure 7:
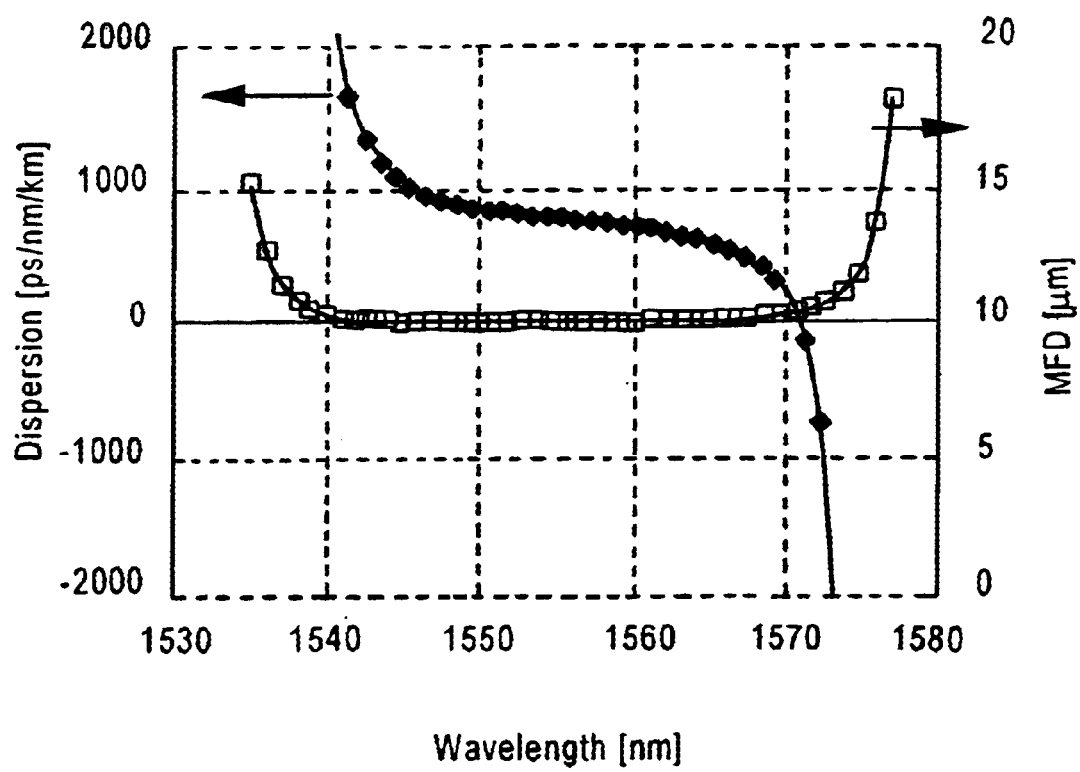
FIG. 7 shows graphs of the dispersion and mode field diameter (MFD) of the optical fiber 1a shown in FIG. 6.

A waveguiding mechanism known as guidance by Bragg reflection, or guidance by photonic bandgap, is described in Stig E. Barkou et al., OFC '99 FG5, and J. A. West et al., ECOC '01 Th.A.2.2. However, these prior art disclosures do not recognize that it is possible to break the structural periodicity by offsetting the holes from the corresponding lattice points. As a result, although a dispersion with a positive dispersion slope was disclosed by J. A. West, a dispersion with a negative dispersion slope has not been known. In the present invention, a dispersion with a negative dispersion slope is realized by forming a region in which a lightwave is guided by offsetting the holes from the corresponding lattice points. FIG. 7 shows the dispersion and mode field diameter (MFD) of the optical fiber 1a shown in FIG. 6. In this example, the pitch of the hexagonal lattice is 1.68 μm, the hole diameter 0.84 μm. The holes 35a in the inner region 11a is located 0.15 lattice period outward from the inner lattice points 41a. The hole 31a at the center of the inner region 11a is located on the inner lattice point 41a. As in this example, it is also preferable to provide in the inner region holes having centers that are located apart from the corresponding lattice points in addition to holes whose centers are located on the corresponding lattice points.

As shown in FIG. 7, the lightwave from 1540 nm wavelength to 1570 nm is localized in the inner region 11a and has a small mode field diameter (MFD). In addition, the dispersion slope is negative in this wavelength range, which is favorable for application to compensation of dispersion with a positive slope. It is also possible to use the optical fiber 1a as a band-pass filter because Bragg reflection occurs in a finite frequency range and hence a wavelength-dependent transmission can be realized.

Figure 8:
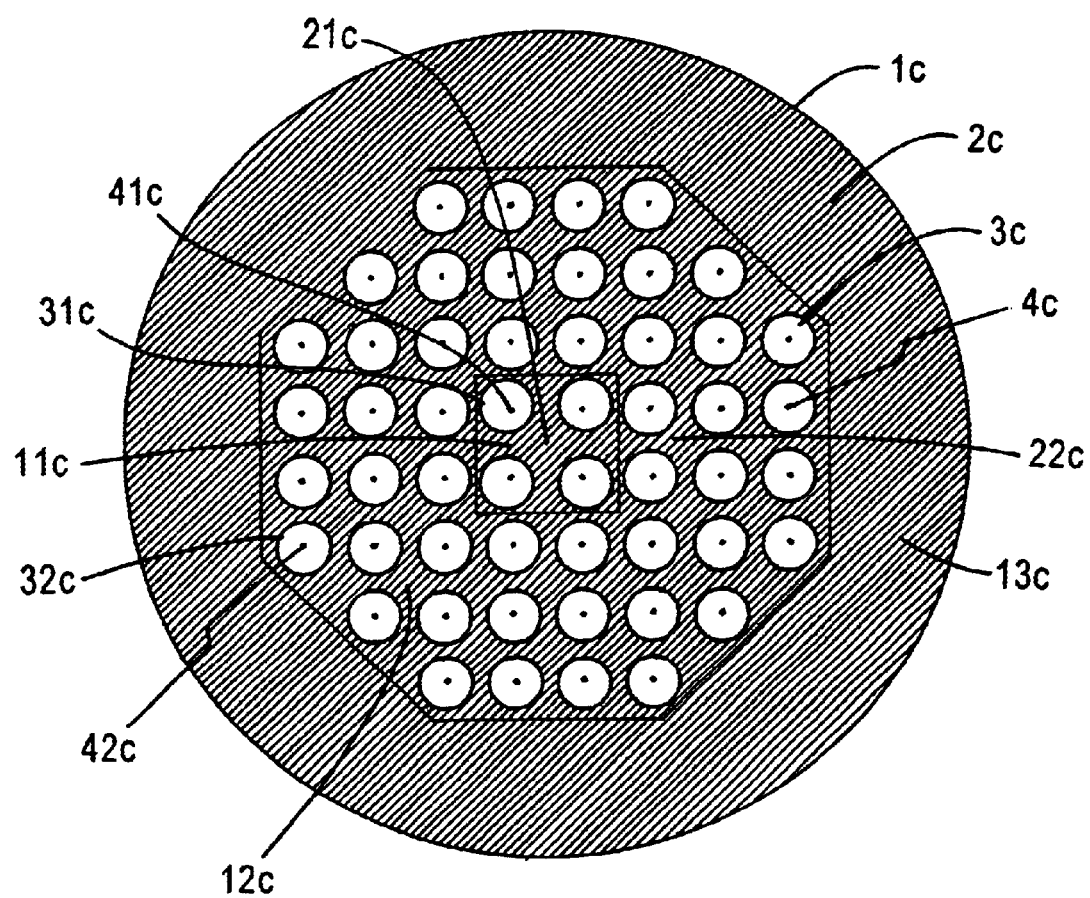
FIG. 8 shows is an illustration of a cross section taken perpendicular to the fiber axis of a microstructured optical fiber in accordance with a third embodiment of the present invention.

FIG. 8 shows the cross section of an optical fiber 1c of a third embodiment of the invention. In the optical fiber 1c, a plurality of holes 3c are arranged in silica glass 2c. The cross section has an inner region 11c and an outer region 12c surrounding the inner region. In this embodiment, the arrangement of the holes is substantially a square lattice. In the outer region 12c, the centers of holes 32c are located at the outer lattice points 42c, which are a part of lattice points 4c of the square lattice and are located in the outer region 12c. On the other hand, in the inner region 11c, the centers of holes 31c are located apart from the inner lattice points 41c by approximately 0.1 lattice period outward. The inner lattice points 41c are a part of lattice points 4c of square lattice and are located in the inner region 11c. For each lattice cell of the lattice point 41c or 42c, a single hole 31c or 32c has its center in the cell. The outer region 12c is further surrounded by a jacket region 13c. Although the jacket region 13c is not essential for waveguiding, it has effects to improve the mechanical strength of the optical fiber 1c and to reduce microbending loss, which is a cause of transmission loss.

Because of the arrangement of the holes described above, the area of the main medium region 21c between the holes 31c in the inner region 11c is larger than that of the main medium region 22c between the holes 32c in the outer region 12c. As a result, the inner region has a higher average refractive index than that of the outer region, and it becomes possible to localize a lightwave in the main medium region 21c in the inner region 11c by total reflection and guide it over the optical fiber.

An investigation has been made comparing optical characteristics of fibers having structures such as illustrated in FIG. 8 with microstructure fibers having holes whose centers substantially coincide with all lattice points a square lattice but lack a hole in the center of the fiber, thereby being provided with a higher average refractive index in the center than that of the surrounding region. Relative hole diameters are given in the following table, wherein structures ra8, ra7 and ra6 represent fiber structures of the present invention as illustrated in FIG. 8 and the structures rb8, rb7 and rb6 have no holes offset from the lattice.

TABLE 2

| Symbol | ra6 | ra7 | ra8 | rb6 | rb7 | rb8 |
|---|---|---|---|---|---|---|
| Relative hole diameter | 0.6 | 0.7 | 0.8 | 0.6 | 0.7 | 0.8 |

In the investigation, the hole diameter has been varied and other dimensions in the fiber have been varied proportionally.

Figure 9:
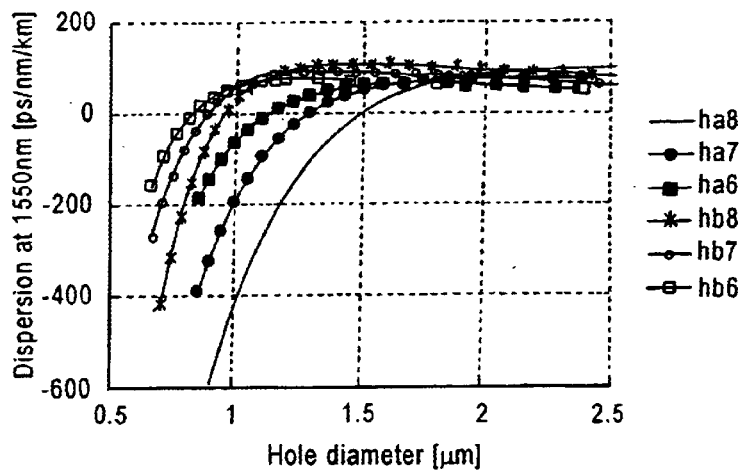
FIGS. 9–11 are graphs showing comparison of various fiber characteristics of fiber structures comporting to the embodiment of FIG. 8 with other fiber structures.
Figure 10:
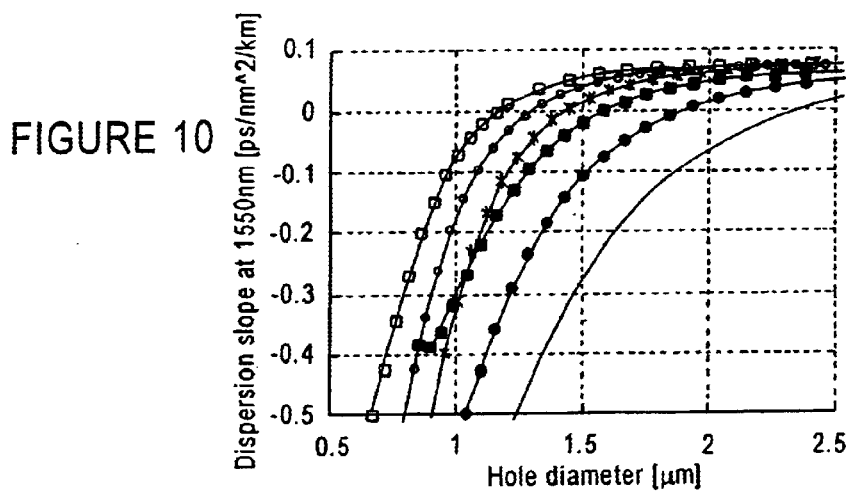
Figure 11:
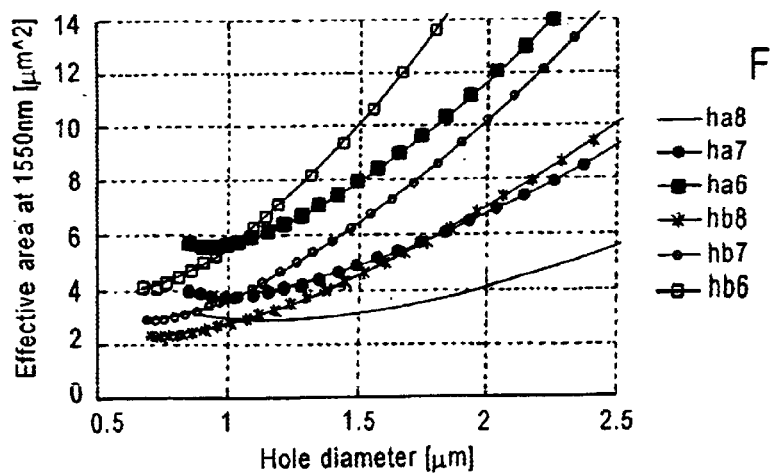

FIGS. 9–11 show various fiber characteristics for each of the listed fibers. FIG. 9 shows the chromatic dispersion at 1550 nm wavelength as a function of the hole diameter. As shown in the figure, the increase in the relative hole diameter results in an increase in the hole diameter below which zero or negative dispersion can be obtained. The hole diameter below which zero or negative dispersion can be obtained is larger for the fibers of the present invention than in the other fibers having the same relative hole diameter. FIG. 10 shows the chromatic dispersion slope at 1550 nm wavelength as a function of the hole diameter. As shown in the figure, the increase in the relative hole diameter results in an increase in the hole diameter below which zero or negative dispersion slope can be obtained. The hole diameter below which zero or negative dispersion slope can be obtained is larger for the fibers of the present invention than in the other fibers having the same relative hole diameter. FIG. 11 shows the effective core area at 1550 nm wavelength as a function of the hole diameter. As shown in the figure, the increase in the relative hole diameter results in an increase in the hole diameter below which small (less than 5 or 6 $\mu m^2$) effective core area can be obtained. The hole diameter below which small (less than 5 or 6 $\mu m^2$) effective core area can be obtained is larger for the fibers of the present invention than in the other fibers that have the same relative hole diameters. These graphs demonstrate advantages obtained with fibers of the present invention.

The optical fibers of the embodiments of the invention described above can be fabricated as illustrated in FIG. 12. First, a preform with a column shape and made of silica glass is fabricated by well-known methods such as VAD method, MCVD method, and OVD method. The silica glass for the preform can be free from impurities, or can include dopants such as germanium, fluorine, chlorine, boron, aluminum, phosphorus, rare earth elements, and transition metals. By appropriately choosing the kind and concentration of the dopants, it is possible to enhance the efficiency of nonlinear optical effects or to realize optical amplifying characteristics.

Second, a plurality of holes 64 extending along the preform length are formed by a boring means 63 in the preform 61, which is secured by grabbing means 62. The arrangement of the holes should be made proportional to that of the holes in the fiber to be made, such as those in FIGS. 2, 6 and 8. It is preferable that the tip 65 of the boring means 63 is made of an alloy including diamond particles or of metal with a surface equipped with diamond particles. It is also possible to enhance the efficiency of boring holes by applying an ultrasonic wave to the boring means 63. Although the holes 64 can penetrate through the preform, it is also possible to end the holes in the midst of the preform so that enough length of the original preform length can be retained for handling in the later steps. Shortening the boring length also shortens the time for the boring step. The holes 64 may be bored, either by rotating the boring means 63 around the axis of a hole 64, or by rotating the preform 61 around the axis of a hole 64, or by rotating both the boring means and the preform.

After the boring step, further processing steps comprise elongating the preform 61, inserting the elongated preform 61 in a glass tube with an inner diameter slightly larger than the outer diameter of the elongated preform 61, and heating and collapsing the glass tube onto the elongated preform 61. Also, it is possible to deposit soot of silica glass onto the outer surface of the preform 61 by vapor phase deposition, and heat and sinter the deposited soot. By employing such steps, it becomes possible to reduce the ratio of the hole diameter to the whole preform diameter, and to equivalently form holes with small diameter that are difficult to form by boring.

It is also possible to etch the inner surface of the holes 64 by hydrofluoric acid solution or $SF_6$ gas. As a result, it becomes possible to eliminate impurities such as hydroxyl group and transition metals on the surface or in the glass near the surface, and to reduce the surface roughness, resulting in a low transmission loss.

Figure 12:
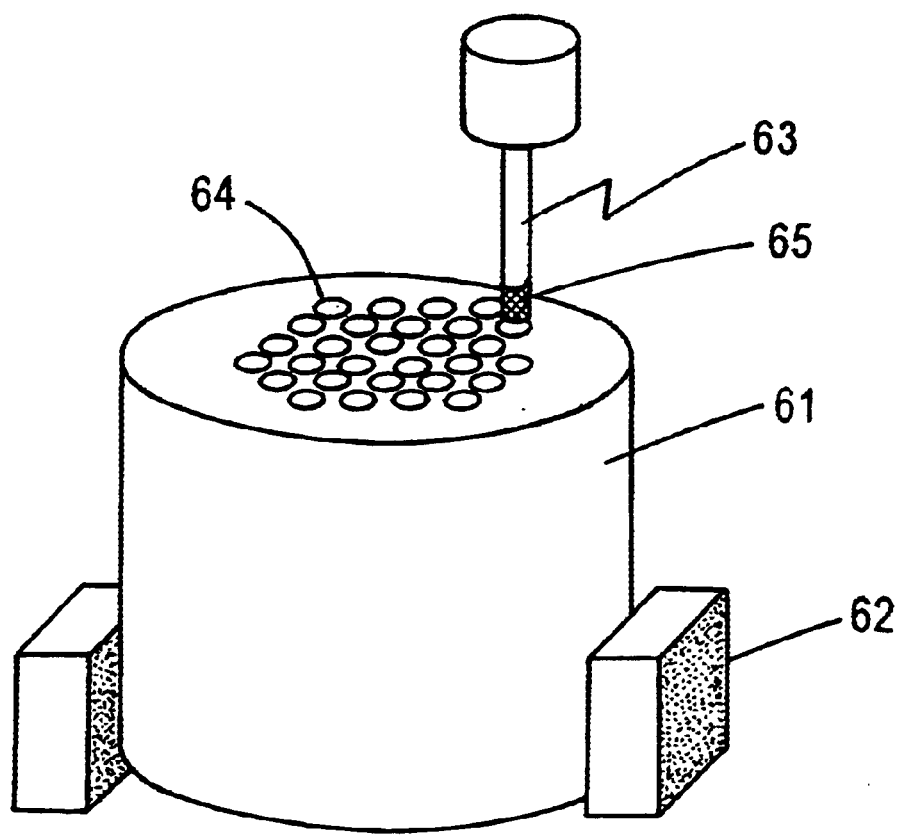
FIG. 12 is illustrative of a process for fabricating a preform in accordance with the present invention.
Figure 13:
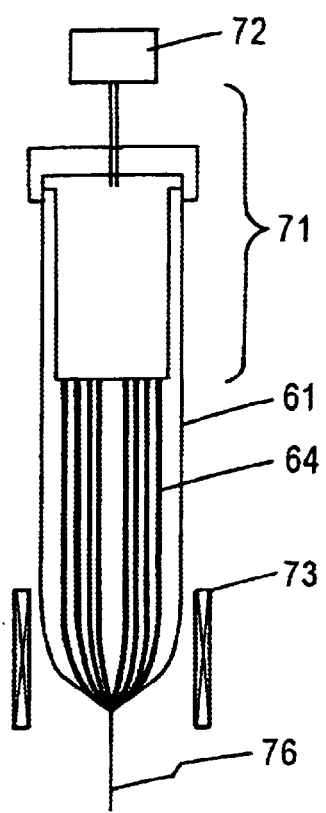
FIG. 13 is illustrative of a process of drawing a preform in accordance with the present invention.
Figure 15:
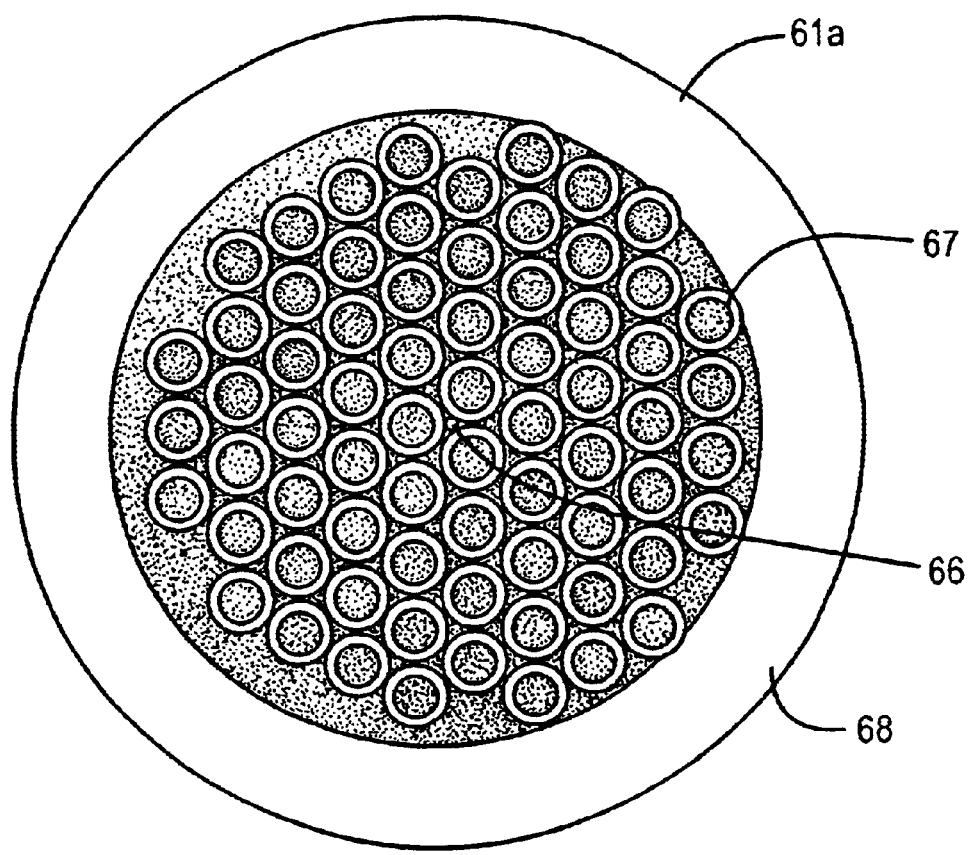
FIG. 15 is illustrative of preform fabrication in accordance with another embodiment of the invention.

Finally, the preform 61 is drawn into an optical fiber as illustrated in FIG. 13. The preform 61 is grabbed by a grabbing means (not shown). An end of the preform 61 having the holes 64 is connected to a pressure adjusting means 72 via a connecting means 71, and thereby the pressure in the holes 64 is adjusted. The arrangement of the holes is same or proportional to that in the preform-febrication step shown in FIG. 12 or 15 given below. From the other end, the preform is fed into a heating means 73 at a predetermined velocity. From the heated and softened portion of the preform, an optical fiber 76 is drawn. The optical fiber is pulled by a pulling means (not shown). The hole diameter in the optical fiber can be controlled by controlling the pressure of the pressure adjusting means 72.

Figure 14:
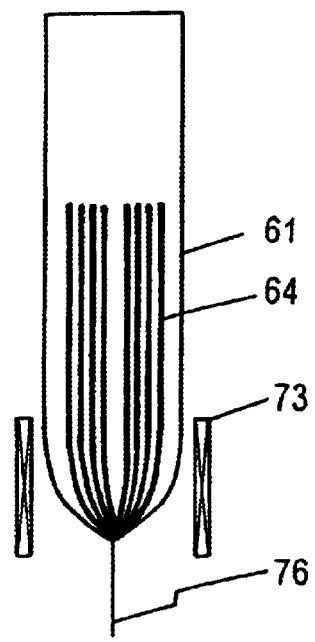
FIG. 14 is illustrative of another process of drawing a preform in accordance with the present invention.

It is also possible to draw an optical fiber from the preform 61 in which the holes 64 are sealed, as shown in FIG. 14. As a result, it becomes easier to prevent contaminants to enter into the holes 64. The arrangement of the holes is same or proportional to that in the preform-febrication step shown in FIG. 12 or 15 given below.

It is also possible to form the holes 64 in the preform 61 not by boring as in FIG. 12. FIG. 15 is illustrative of preform fabrication to obtain optical fibers using several different materials. A preform 61a can be formed by arranging a plurality of silica capillaries 67 around a silica rod 66 into a bundle, and insert the bundle into a silica jacket tube 68. The silica rod 66 has a smaller diameter than the silica capillaries 67. Then, the preform 61a is drawn in the step as shown in FIG. 13 or 14. The drawing temperature is chosen so that the interstitial gaps between the silica capillaries 67 shrink and/or close by surface tension. Since the flow amount of softened glass accompanying the shrink of the gap is small where the silica rod 66 exists, the distance between the holes becomes larger there than elsewhere in the cross section. As a result, an optical fiber with a cross section that is similar to that in embodiment 1 can be obtained.

The preform fabrication method of FIG. 15 is suited to fabricate optical fibers using several different materials. For example, by employing silica with more than 10 mol % of germanium as the material of the silica rod 66, the efficiency of the nonlinear optical effects can be enhanced. Also, by employing a silica rod 66 doped with rare earth elements, an optical fiber with optical amplifying characteristics can be obtained.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. An optical fiber comprising:
   a main medium having a predetermined refractive index, and
   a plurality of sub medium regions, having a refractive index different from that of the main medium, and arranged in a region of the main medium along a length of at least a portion of the fiber to demarcate an inner region and an outer region surrounding the inner region, and wherein
   a cross section of the fiber portion conforms to a translationally symmetric lattice, a center of each sub medium region in the outer region coinciding with respective lattice points, and a plurality of sub medium regions in the inner region having centers that are offset from respective lattice points.

2. An optical fiber as recited in claim 1, wherein the inner region comprises a core area having an average refractive index that is higher than the average refractive index of the outer region.

3. An optical fiber as recited in claim 2, in which the main medium is pure or doped silica glass and the sub medium is a gas having a predetermined pressure.

4. An optical fiber as recited in claim 3, wherein at least 1 mol % of $GeO_2$ is doped in at least a part of the main medium.

5. An optical fiber as recited in claim 1, in which distribution of the refractive index in the outer region substantially possesses two-dimensional translational symmetry in cross section to support a waveguide mode guided by Bragg reflection.

6. An optical fiber as recited in claim 5, in which the main medium is pure or doped silica glass and the sub medium is a gas having a predetermined pressure.

7. An optical fiber as recited in claim 1, wherein cross-sectional areas of the sub medium regions are substantially uniform in the cross section.

8. An optical fiber as recited in claim 1, wherein:
   the translationally symmetric lattice is a hexagonal lattice,
   the inner region includes three inner lattice points that are three vertices of a regular triangle with edges of lengths equal to lattice period, and
   centers of sub medium regions corresponding to the three inner lattice points are located outside of the circumcircle of the regular triangle.

9. An optical fiber as recited in claim 1, wherein:
   the translationally symmetric lattice is a square lattice,
   the inner region includes four inner lattice points that are four vertices of a square with edges of lengths equal to lattice period,
   centers of sub medium regions corresponding to the four inner lattice points are located outside of circumcircle of the square.

10. An optical fiber as recited in claim 1, wherein minimum of curvature radii of the sub medium regions is greater than or equal to 1.2 $\mu$m, and chromatic dispersion at a predetermined wavelength from 1280 nm to 1800 nm is less than or equal to zero.

11. An optical fiber as recited in claim 1, wherein minimum of curvature radii of the sub medium regions is greater than or equal to 1.7 μm, and chromatic dispersion slope at a predetermined wavelength is less than or equal to zero.

12. A optical fiber as recited in claim 1, in which minimum of curvature radii of the sub medium regions is greater than or equal to 2.0 μm, and effective core area at a predetermined wavelength is less than two times of the square of the wavelength.

13. An optical fiber comprising a main medium having a predetermined refractive index, and a sub medium having a refractive index different from that of the main medium, and a plurality of regions of the sub medium are arranged in a region of the main medium, and wherein:

in at least a section of the fiber, minimum of curvature radii in cross section of the sub medium regions is greater than or equal to 1.2 μm, and chromatic dispersion at a predetermined wavelength from 1280 nm to 1800 nm is less than or equal to zero.

14. An optical fiber comprising a main medium having a predetermined refractive index, and a sub medium having a refractive index different from that of the main medium, and a plurality of regions of the sub medium are arranged in a region of the main medium, and wherein:

in at least a section of the fiber, minimum of curvature radii in cross section of the sub medium regions is greater than or equal to 1.7 μm, and chromatic dispersion slope at a predetermined wavelength is less than or equal to zero.

15. An optical fiber comprising a main medium having a predetermined refractive index, and a sub medium having a refractive index different from that of the main medium, and a plurality of regions of the sub medium are arranged in a region of the main medium, and wherein:

in at least a section of the fiber, minimum of curvature radii in cross section of the sub medium regions is greater than or equal to 2.0 μm, and effective core area at a predetermined wavelength is less than two times of square of the wavelength.

* * * * *